United States Patent [19]

Carlin

[11] Patent Number: 5,665,246

[45] Date of Patent: Sep. 9, 1997

[54] CATALYZED HYPOCHLORITE DECOMPOSITION PROCESS

[75] Inventor: Maoliosa Carlin, Middlesbrough, England

[73] Assignee: Imperial Chemical Industries PLC, London, England

[21] Appl. No.: 427,824

[22] Filed: Apr. 26, 1995

Related U.S. Application Data

[63] Continuation of Ser. No. 104,065, Aug. 12, 1993, abandoned.

[30] Foreign Application Priority Data

Apr. 9, 1991 [GB] United Kingdom .................. 9107404

[51] Int. Cl.$^6$ ........................................... C01B 13/02
[52] U.S. Cl. ........................ 210/750; 210/752; 423/579
[58] Field of Search ............................. 210/750, 752; 423/579

[56] References Cited

U.S. PATENT DOCUMENTS 4,963,341  10/1990  Huxtable et al. .................. 423/579
5,039,429   8/1991  Laundon et al. ................... 210/750

FOREIGN PATENT DOCUMENTS 276044   7/1988  European Pat. Off. .
2236692  4/1991  United Kingdom .

OTHER PUBLICATIONS

Patent Abstracts of Japan, vol. 4, No. 65 (May 1980) & JP,A,55 031 423 (Mar. 1980) see abstract.

*Primary Examiner*—Wayne Langel
*Attorney, Agent, or Firm*—Cushman Darby & Cushman, L.L.P.

[57] ABSTRACT

A process wherein a particulate catalyst, which is disposed in at least two serially connected beds, is contacted by a hypochlorite containing liquid to decompose the hypochlorite and evolve oxygen is improved by arranging that the liquid flows in a direction counter to that of the evolved oxygen in each of the beds. The efficiency with which the hypochlorite is decomposed is greater than when the liquid is in cocurrent or alternating co and counter current flow.

4 Claims, 1 Drawing Sheet

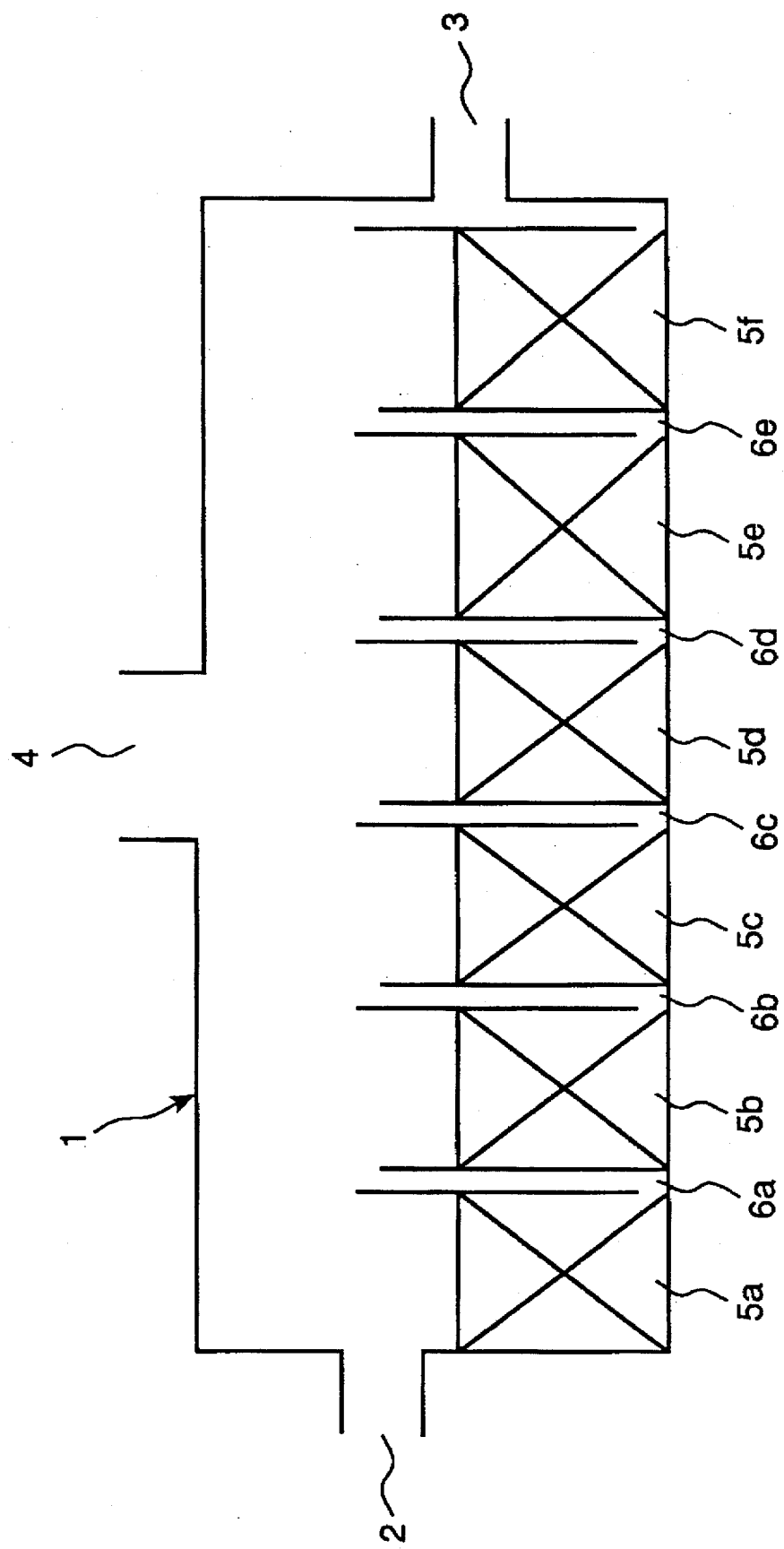

1

CATALYZED HYPOCHLORITE DECOMPOSITION PROCESS

This is a continuation of application Ser. No. 8/104,065, filed on Aug. 12, 1993.

This invention relates to a catalysed process for the decomposition of hypochlorite ions.

It is known, from for example, U.S. Pat. No. 3965249, that hypochlorite ions contained in an aqueous stream may be catalytically decomposed using an unsupported catalyst, which is also carried by the aqueous stream, during flow of the aqueous stream through a baffled tank. During the process gaseous oxygen is evolved as one of the decomposition products with the concomitant production of chloride ions. It is shown that the aqueous stream alternates between upflow and downflow, i.e. between cocurrent and counter current flow relative to the evolving oxygen, throughout its passage through the baffled tank.

Similarly, a process is disclosed in the UK Patent Application, GB 2236692 A, (published 17 Apr. 1991) for the catalysed decomposition of hydrogen peroxide, or hypochlorite ions, by contact with a particulate catalyst disposed with a number of serially connected reaction volumes. The liquid stream containing the hydrogen peroxide, or hypochlorite ions, is shown contacting the particulate catalyst in alternating upflow and downflow.

Japanese kokai 62-176592 discloses a process for the catalysed decomposition of hypochlorite ions, wherein a liquid stream containing such ions is contacted upflow with a single bed of particulate catalyst.

It has been found that the catalysed decomposition of hypochlorite ions using a particulate catalyst may be more efficiently accomplished if the hypochlorite ion containing stream is in downflow, i.e. is in counter current flow relative to the evolving oxygen.

Accordingly, we provide a catalysed hypochlorite decomposition process comprising contacting a hypochlorite ion containing liquid stream with a particulate catalyst capable of decomposing hypochlorite ions, thereby liberating gaseous oxygen, wherein the particulate catalyst is disposed in at least two serially connected beds and the liquid stream is substantially in counter current flow to the gaseous oxygen whilst the hypochlorite ions are being decomposed in each of the at least two serially connected beds.

The present invention is particularly effective where the concentration of hypochlorite ions in the liquid stream, expressed in terms of g.l$^{-1}$ of sodium hypochlorite, is at least 20, for example 20 to 250, and in particular between 20 and 150. Nevertheless, the present invention can be used where the concentration of the hypochlorite ions is less than 20, for example from 10 to 20, or even as low as 1 g.l$^{-1}$.

The reaction conditions, such as liquid space velocity (LHSV), temperature and pressure are usually chosen to maximise decomposition of the hypochlorite ions. Typical values for these parameters are an LHSV from 0.1 to 10, e.g 0.1 to 5 hr$^{-1}$, a temperature from 10° to 90° C. and a pressure at, or slightly above, atmospheric.

The specific physical form of the particulate catalyst is not crucial to the operation of the invention, thus the particulate catalyst my be of the form of pellets, tablets or granules. A particularly advantageous particulate catalyst that can be used is that described in EP 0397342 A, published 14 Nov. 1990.

The particulate catalyst is preferably disposed within a number of serially connected reaction volumes, as shown in GB 2236692 A, except that flow of the hypochlorite ion containing stream through each reaction volume is counter current to the gaseous oxygen evolved. Transfer of the hypochlorite ion containing stream between successive reaction volumes my be by any convenient means. Where the reaction volumes are arranged in a cascade, and the flow of the hypochlorite ion containing stream through the reaction volumes is through the action of gravity, then the reaction volumes my be connected using intervening catalyst free risers wherein no decomposition of hypochlorite ions occurs.

The invention is further illustrated by reference to the accompanying figure.

BRIEF DESCRIPTION OF DRAWING

FIG. 1 is a schematic view of a reactor wherein the present invention may be conducted.

FIG. 1 shows a reactor (1) comprising an inlet (2) through which the hypochlorite ion containing stream enters the reactor (1), an outlet (3) through which a hypochlorite ion depleted effluent stream is discharged, and a gas out (4) through which the evolved oxygen is discharged. Contained within the reactor (1) are a number of reaction volumes ($5a;5b;5c;5d;5e;5f$), each reaction volume containing a bed of particulate catalyst which the hypochlorite ion containing stream contacts during passage thereof through the reactor (1). The hypochlorite containing stream is directed between successive reaction volumes by a riser ($6a;6b;6c;6d;6e$) wherein no particulate catalyst is disposed.

It may be advantageous to preheat the hypochlorite ion containing stream prior to contact with the particulate catalyst. Thus, in a variant on the above described reactor, the first reaction volume does not contain the particulate catalyst, but does contain a preheater to maintain the optimum reaction temperature for the subsequently catalysed reaction.

In a further variant, the reactor may contain other reaction volumes downstream of those wherein the hypochlorite ion containing stream is in counter current flow to the evolved oxygen. Because the hypochlorite ion containing stream has a reduced concentration of hypochlorite ions, when it contacts the particulate catalyst in these other reaction volumes, the hypochlorite ion containing stream may be in either counter or cocurrent flow with the evolved oxygen.

The invention is further illustrated by reference to the following examples.

A reactor comprising 5 sequentially arranged reaction volumes was used to assess the relative effect of liquid upflow and downflow on the rate at which hypochlorite ions can be decomposed. The reaction volumes were configured such that there was alternating upflow and downflow through successive reaction volumes, with the first reaction volume receiving the hypochlorite ion containing stream in upflow.

Each reaction volume contained sufficient particulate catalyst to achieve the desired liquid hourly space velocity (LHSV). The particulate catalyst used was that described as Extrudate A in published EP 0397342 A and having a diameter of about 3 mm.

Samples of the hypochlorite ion containing stream were taken from the inlet and exit of each reaction volume and the inlet and exit sodium hypochlorite concentrations were thus determined.

The efficiency of each reaction volume was measured by calculating the first order rate constant derivable from the LHSV, and the inlet and outlet sodium hypochlorite concentrations for each reaction volume.

The results are shown in the following Table.

| LHSV | Inlet Temp | Inlet Conc | First Order Rate Constant for Reaction Volume (hr$^{-1}$) | | | | |
|---|---|---|---|---|---|---|---|
| (hr$^{-1}$) | (°C.) | (g · l$^{-1}$) | 1* | 2 | 3* | 4 | 5* |
| 0.256 | 31.2 | 96.9 | 1.93 | 5.60 | 0.68 | 1.66 | 1.31 |
| 0.479 | 31.6 | 88.6 | 3.75 | 10.57 | 1.44 | 4.74 | 1.76 |
| 0.547 | 32.0 | 86.6 | 4.45 | 8.06 | 2.43 | 3.45 | 1.03 |
| 0.872 | 26.4 | 59.0 | 3.66 | 6.82 | 2.38 | 3.62 | 1.23 |

*comparative upflow examples.

It can thus be seen that those reaction volumes through which the hypochlorite ion containing stream flows in downflow show a significantly higher first order reaction rate constant than those in upflow.

In a further set of examples each of a number of reaction volumes was filled with a known volume of a 2 mm diameter version of Extrudate A. A hypochlorite ion containing stream was then passed through each reaction volume in either counter or cocurrent flow to the evolved oxygen at a temperature of about 40° C. The efficiency of each reaction volume was then assessed by calculating the first order rate constant derived from the LHSV, and the inlet and outlet sodium hypochlorite concentrations.

The results are shown in the following Table.

| NaOCl Concentration | | | LHSV (hr$^{-1}$) | | First Order Rate Constant (hr$^{-1}$) for Reaction Volume | |
|---|---|---|---|---|---|---|
| Inlet (g · l$^{-1}$) | Outlet (mg · l$^{-1}$) | | | | | |
| | Down | Up | Down | Up | Down | Up |
| 97.42 | 146 | 1094 | 7.4 | 6.2 | 4.8 | 2.7 |
| 69.03 | 88 | 6710 | 6.6 | 7.9 | 4.4 | 3.7 |
| 48.94 | 17 | 266 | 6.7 | 6.7 | 5.3 | 3.5 |
| 32.64 | 14 | 102 | 6.4 | 7.3 | 5.0 | 4.2 |
| 26.58 | 10 | 23 | 7.1 | 7.1 | 5.6 | 5.0 |

It can thus be seen that counter current flow consistently produces a higher reaction rate, and a lower exit concentration of sodium hypochlorite.

I claim:

1. A catalysed hypochlorite decomposition process comprising contacting a hypochlorite ion containing liquid stream with a particulate catalyst that is capable of decomposing hypochlorite ions with the liberation of gaseous oxygen, disposed in at least two serially connected beds arranged in cascade with risers free of catalyst between successive beds, said liquid stream being passed down through at least the first two of said serially connected beds, substantially in counter current flow to the gaseous oxygen liberated by the decomposition of the hypochlorite ions and up through the risers between the successive beds, under the action of gravity.

2. A process as claimed in claim 1 wherein the concentration of hypochlorite ions in the liquid stream, expressed in terms of g.l$^{-1}$ of sodium hypochlorite, is at least 20.

3. A process as claimed in claim 1 wherein the liquid stream flows through the beds of particulate catalyst at a liquid hourly space velocity (LHSV) of from 0.1 to 10 hr$^{-1}$.

4. A process as claimed in claim 1 wherein the liquid stream flows through the beds of particulate catalyst at a temperature of from 10° to 90° C.

* * * * *